United States Patent [19]

Azuma

[11] Patent Number: 5,562,414
[45] Date of Patent: Oct. 8, 1996

[54] NOISE REDUCTION DEVICE FOR ROTORCRAFT

[75] Inventor: Akira Azuma, Kawasaki, Japan

[73] Assignee: Kawada Industries, Inc., Tokyo, Japan

[21] Appl. No.: 459,722

[22] Filed: Jun. 2, 1995

[30] Foreign Application Priority Data

Jun. 30, 1994 [JP] Japan .................... 6-170431

[51] Int. Cl.⁶ .................................. B64C 27/46
[52] U.S. Cl. .................. 416/90 A; 244/1 N; 244/199
[58] Field of Search ................. 416/20 R, 90 R, 416/90 A, 92; 244/17.11, 199, 1 N

[56] References Cited

U.S. PATENT DOCUMENTS

| | | | |
|---|---|---|---|
| 3,090,584 | 5/1963 | Kuchemann et al. | 244/199 |
| 3,692,259 | 9/1972 | Yuan | 244/199 |
| 4,040,578 | 8/1977 | Yuan | 416/20 R |
| 5,158,251 | 10/1992 | Taylor | 244/199 |

FOREIGN PATENT DOCUMENTS

| | | | |
|---|---|---|---|
| 1756541 | 4/1970 | Germany | 244/199 |
| 1945957 | 3/1971 | Germany | 416/20 R |
| 5-124589 | 5/1993 | Japan . | |
| 5-345596 | 12/1993 | Japan . | |
| 6-199295 | 7/1994 | Japan | 416/92 |

*Primary Examiner*—James Larson
*Attorney, Agent, or Firm*—Frishauf, Holtz, Goodman, Langer & Chick

[57] ABSTRACT

A noise deduction for a rotorcraft includes a unit to produce compressed air, a drive shaft provided with a first air supply passage in which the compressed air from the air-producing unit flows, and rotor blades provided with second air supply passages in which the air from the first air supply passage flows. In order to eject the compressed air supplied from the rotor blades, ejection nozzles having an ejection adjusting mechanism therein are arranged at respective blade tips of the rotor blades and respective trailing edges thereof in the rotational direction. In operation, the ejection nozzles eject the compressed air to the radial direction of the rotor blades, so that, since the blade tip vortex in the vicinity of the blade tip of the preceding rotor blade is relocated outside the blade tip of the following rotor blade, a direct collision thereof on the vortex can be avoided.

7 Claims, 3 Drawing Sheets

NOISE REDUCTION DEVICE FOR ROTORCRAFT

BACKGROUND OF THE INVENTION

The present invention relates to a device for reducing noise and vibration caused by rotation of rotor blades of a rotorcraft such as a helicopter, and for improving kinetic efficiency thereof.

In the field of rotorcraft, it is generally known that, by the rotation of rotor blades, blade tip vortices of air current are generated along the rotational tracks of tips of the rotor blades and aerodynamic noise and vibration of the rotor blades are generated by a rotor blade beating the blade tip vortex which has been generated by the preceding rotor blade.

In the prior art to reduce such noise and vibration caused by the blade tip vortex interaction, there has been suggested a rotor blade of which blade tip is shaped so as to restrict an occurrence of the concentrated blade tip vortex. The above mentioned rotor blade can restrict the occurrence of the concentrated tip vortex to a certain extent, however, it cannot exclude the occurrence of vortex itself, so that there still remains the problem of the blade vortex interaction.

Alternately, in Japanese Unexamined Patent Publications (Kokai) Nos. 5-345596 and 5-124589, mechanisms (a device for controlling boundary layers in the vicinity of the rotor blades; a special rotor blade) are disclosed, wherein each rotor blade has a number of small orifices formed on blade surfaces and nozzles formed at the blade tip. In these arts, it is contemplated that, in operation, the air sucked into the rotor blade through the small orifices is discharged from the nozzles toward the center of the blade tip vortex thereby decreasing the intensity of blade tip vortex and improving the aerodynamic performance of the blade. In the above mentioned mechanism, however, since the air is discharged from the rotor blade owing to the centrifugal force thereof, it is difficult to ensure that the discharging air is intense enough to blow away the vortex already produced. In such a case, the discharged air will be swirled into the vortex flow and the intensity of the tip vortex cannot be reduced. Also, even if the air discharged from the blade tip directs its course toward the center of the blade tip vortex, an additional power is required to overcome the Coriolis force of the air flowing in the blade.

In the above mechanism, since the nozzles are fixed to the blade tips, the direction of air discharged from the nozzle is also fixed in the rearward direction which is intended to inject the air into the center of the tip vortex along the track of the blades.

In practice, however, the position of the blade tip vortex and the intensity and size thereof, vary with the flight velocity, attitude and mode of the rotorcraft, and with the environmental wind conditions. Furthermore, the blade tip vortex, after being generated, grows successively in a conical shape, increasing its vortex core size gradually. Therefore, even if the air is ejected from the blade tip rearward along the track of the blade, it is not always possible to effectively supply the air toward the center of the vortex. That is, there still exists a problem in the above mentioned arrangement with the fixed position nozzles which cannot effectively reduce the intensity of the blade tip vortex.

Next, to reduce the noise and vibration caused by the interference of the blade tip vortex of the preceding rotor blade with the following rotor blade, there is a known method of controlling the pitch angle of the rotor blades. However, this is a more complicated method since the pitch angle is controlled at a high frequency by using heavy-duty steering actuators in the arrangement.

Besides the above mentioned prior art, there is a known method of alleviating vortex generated in the vicinity of blade tip by actuating a movable flap, which is arranged on the trailing edge of the rotor blade, upward and downward. However, this method causes the structure of the rotor blade to be complicated, resulting in many problems in terms of its aerodynamic characteristics, maintenance, reduction in strength and so on.

SUMMARY OF THE INVENTION

It is therefore the objective of the present invention to provide a noise reduction device for rotorcraft, which is capable of solving the above mentioned faults in the prior art.

The objective of this invention can be accomplished by:

a source of compressed air, located in the fuselage of the rotorcraft;

a drive shaft, driven by the engine of the rotorcraft, which has an air supply passage through which the compressed air is supplied;

rotor blades connected to the drive shaft, each of which has an air supply passage to connect to the air supply passage of the drive shaft;

ejection nozzles for ejecting the compressed air from the air supply passage and out of the rotor blades, the ejection nozzles located at the blade tip and on the trailing edge of the blade; and a means to adjust the pressure and the amount of compressed air and the angle of the ejected air from the ejection nozzles corresponding to the flight condition of the rotorcraft and the rotational position of each of the rotor blades.

With the arrangement mentioned above, the ejection nozzles at the blade tips eject the compressed air to the radial direction of the rotor blades, that is, outside the blade tips thereby blowing the blade tip vortex away from the vicinity of the blade tip and out of the rotational area of the rotor blade. Consequently, since a blade tip vortex is moved out of the vicinity of the blade tip of the following rotor blade, a direct collision on the vortex generated by the rotation of the preceding rotor blade can be avoided.

To cope with a case where the vortex driven out in this way intrudes back into the rotational area of the rotor blades due to various reasons of flight conditions, the ejection angle adjusting device in the ejection nozzles can be operated to eject the compressed air upward or downward. Consequently, the blade tip vortex is moved upward or downward of the rotating plane of the rotor blades, therefore the interference of the blade tip vortex with the rotor blade can be avoided.

In addition, even if the preceding blade tip vortex has been forced to below or above the plane of rotation as described above, there are cases when the tip vortex intrudes into the rotor blade plane of rotation, depending on the flight and/or air flow condition. In such cases, before the following blade strikes the tip vortex produced by the preceding blade, the following blade changes its tracking pass up or down by the reaction of air ejected upward or downward through its jet nozzle, thus avoiding the meeting of the following blade and the preceding tip vortex, and accurately controls the generation of noise and the vibration of the rotor blade.

Moreover, by the proper selection of the location of the ejection nozzles and the pressure and flow rate of the air to be ejected, the intensity of the blade tip vortex can be significantly reduced and the strong vortex core can be defused, then the blade vortex interference itself does not occur, and the accompanying problems of noise and vibrations can be solved.

As described above, when the tip vortex is forced to be located above or below the rotor blade plane of rotation by ejecting air upward or downward using the ejection angle control device, or the blade tracking pass is changed upward or downward by the reaction of upward or downward ejection of air, it is possible to accomplish this task only by the air jet ejected from the nozzle at the blade tip. But, the air ejected upward or downward from the jet nozzle on the trailing edge of the blade tip end can suitably control the blade tracking pass alteration and separate the position of the tip vortex and its pass from the plane of rotation.

BRIEF DESCRIPTION OF THE DRAWINGS

These and other objects and features of the present invention will become more fully apparent from the following description and appended claims taken in conjunction with the accompanying drawings.

DESCRIPTION OF THE PREFERRED EMBODIMENT

One embodiment of the present invention of noise reduction device is described using the drawings.

Figure 1:
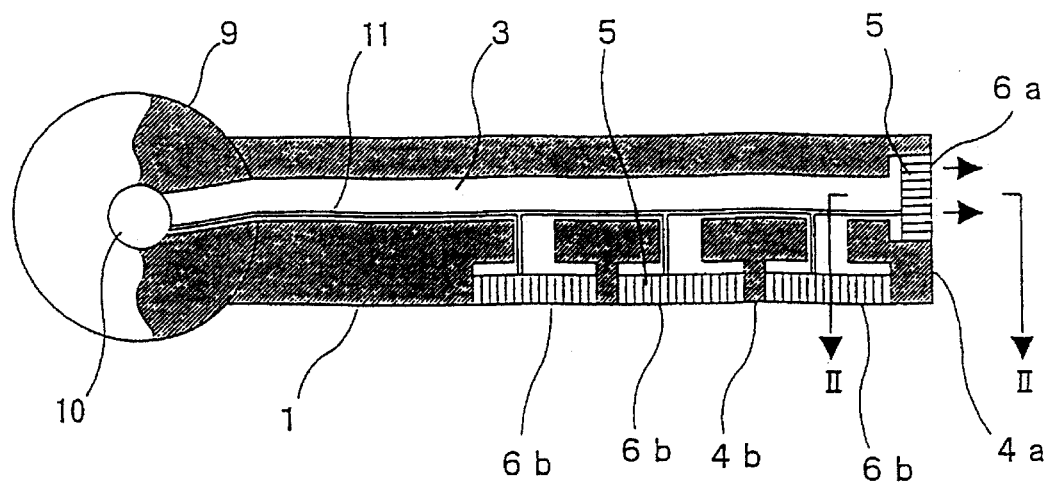
FIG. 1 is a plan view showing the interior structure of a rotor blade constituting a noise reduction device of the present invention.
Figure 2:
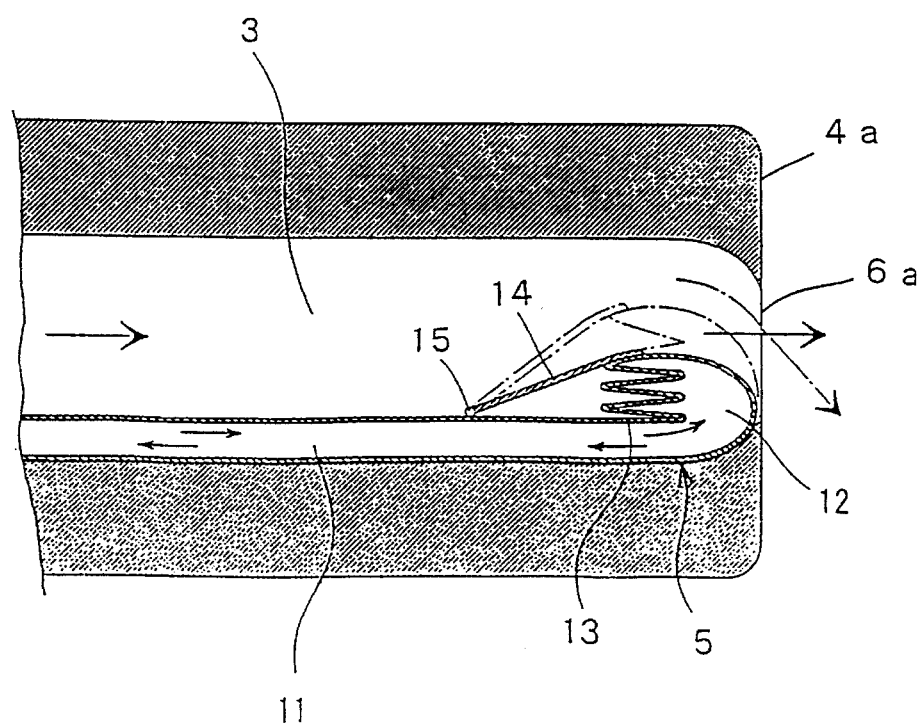
FIG. 2 is a cross sectional view taken along a line of II—II of FIG. 1.

FIGS. 1 and 2 show a partially sectioned plan view and a sectional view of a rotor blade interior arrangement. The rotor blade 1 of this system contains an air supply passage 3 to supply compressed air furnished from a fuselage 2 toward the blade tip. Air ejecting nozzles 6a and 6b are equipped with the compressed air ejection angle control device 5 on blade tip 4a and on trailing edge 4b near the blade tip.

Figure 3:
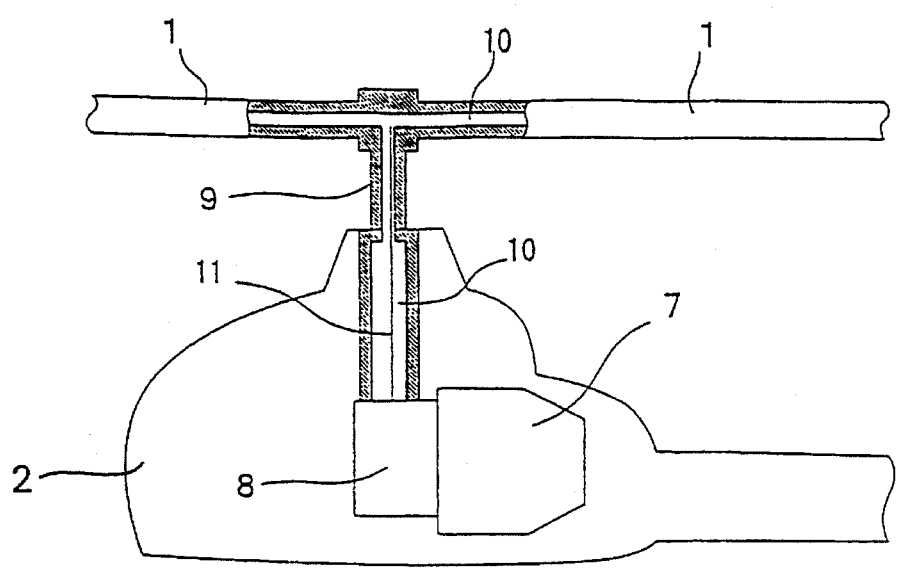
FIG. 3 is a side view of the airframe showing the structure of air-supply path.

As FIG. 3 shows, an air pressure control device 8 equipped with various valving devices necessary to connect to the air compressor of the engine 7 is located in the fuselage 2. The air supplied by the engine 7 passes through the air pressure control device 8 described earlier and the duct 10 installed in the drive shaft 9. The compressed air with predetermined jet pressure and flow rate is supplied to the air ejecting nozzles 6a and 6b on the blade tip 4a and on the trailing edge 4b near the blade tip from the air supply passage 3 within the blade 1.

In addition, a regulating air supply passage 11 is provided in parallel with, but separate from, the air supply passage 3 through the inside of the drive shaft 9 from the air pressure control system 8. The end of a regulating air supply passage 11 is connected to the ejection angle control device 5 of the air ejecting nozzles 6a and 6b located within the blade tip 4a and the trailing edge 4b near the blade tip.

The ejection angle control device 5 of the air ejecting nozzles 6a and 6b consists of, as shown in FIG. 2 for example, a rubber or plastic air tube 12 located on a near side of the air ejecting nozzles 6a and 6b. A regulating air supply passage 11, located in parallel with the air supply passage 3, is connected to this air tube 12. The ejection angle control device 5 transmits the required amount of air into the air tube 12 through a regulating air supply passage 11, or adjusts the amount of air in the air tube 12 by suction as necessary. Thus, by changing the shape of the air tube 12, the size of the throat area of the air ejecting nozzles 6a and 6b is either increased or decreased, consequently the direction of the air jet from the nozzles 6a and 6b can be properly controlled.

The air tube 12 contains bellows 13 on the inner side of the blade, or on the connecting side of a regulating air supply passage 11, and the bellows 13 maintains the height of the tube 12 in the lowered form as shown by the solid lines when the amount of air in the tube 12 is relatively small. In this condition, the air transmitted through the air supply passage 3 is ejected nearly horizontally from the nozzles 6a and 6b. When a predetermined amount of air is supplied to the air tube 12, the bellows 13 expands as shown by the broken lines, providing the required height. The jet of air can be directed downward from the nozzles 6a and 6b because the air in the air supply passage 3 flows into the nozzles 6a and 6b over the tube 12.

As described above, in order to eject air downward from the nozzles 6a and 6b, a predetermined amount of air is supplied to the air tube 12, expanding the bellows 13. At this time, the compressed air that flows through the air supply passage 3 rushes to the bellows 13, creating a force to blow the air tube 12 to outside of the ejecting nozzles. Then, there may be a chance of damaging the air tube 12.

As a remedy to prevent such damages, a pivotable flap 14 about the hinge 15 is provided onto the control air passage 11. The free end of the flap 14 is placed on the bellows 13 in the air tube 12. Then, when the bellows 13 in the air tube 12 expands, the compressed air passing through the air supply passage 3 does not directly strike the bellows 13, and the air flows out following the inclined surface of the flap 14 over the air tube 12, thus preventing damage to the air tube 12.

The ejection angle control device 5 of the air tube 12 is easily provided using a freely flexible air pressure activated mechanism within the limited small space of a rotor blade cross section. In addition, because the mechanism causes little trouble during the usage, it can be utilized relatively trouble free. However, the ejection angle control device 5 is not necessarily limited to the air tube described above. Besides the above design, it can be a jet ejection nozzle of a cylinder shape, for example, with a linkage mechanism placed in the blade and controlled from the cockpit to properly change the ejection angle.

In the example described above, the ejection angles from the ejection nozzles at the blade tip 4a and the trailing edge 4b near the blade tip were discussed as the horizontal direction and the downward direction from the blade. However, using the ejection angle control device 5 the ejection angle is not limited to those two directions described, and it is possible to direct the jet of air to upward or rearward.

Figure 4:
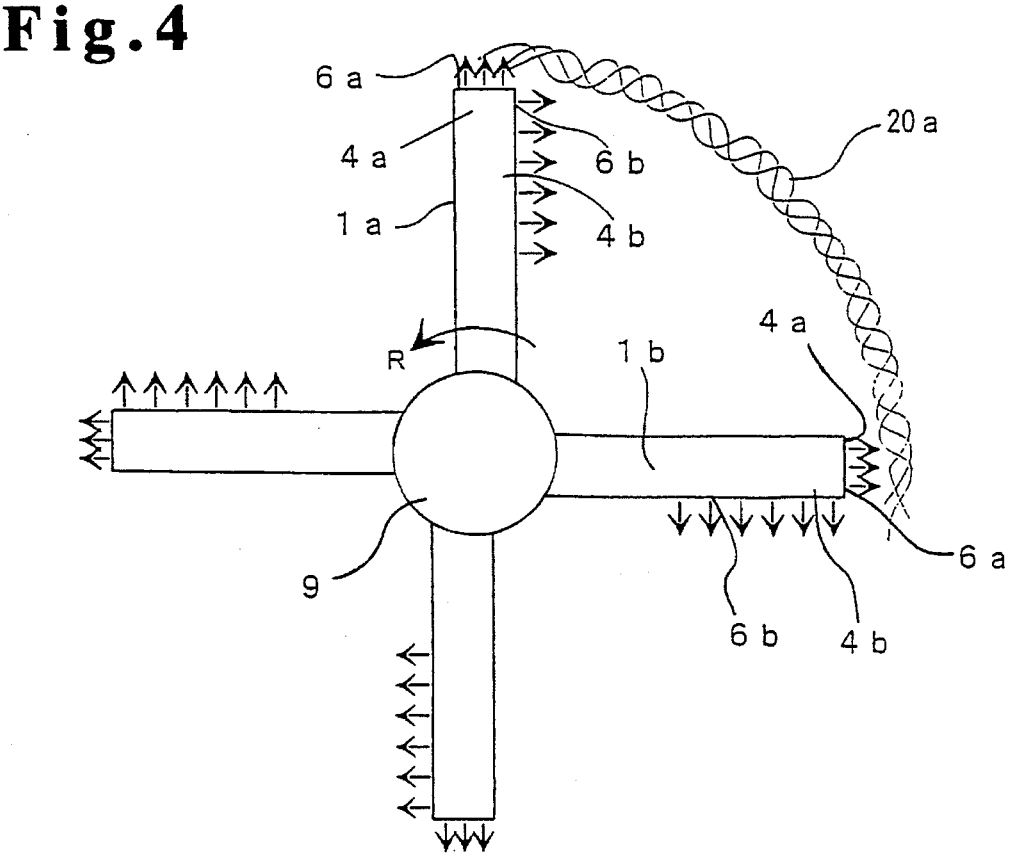
FIG. 4 is a plan view showing the relationship between rotor blades with the noise reduction device of the present invention and blade tip vortices caused by the rotor blades.

As described earlier, according to the system of this invention, by horizontally ejecting compressed air from the nozzles 6a and 6b at the blade tip 4a and on the trailing edge 4b near the blade tip, as shown in FIG. 4, the jet of air from the nozzle 6a at the blade tip 4a blows the air located outside of the blade tip 4a away to the outside of the blade tip tracking pass, thus preventing the air around the blade tip to flow into the downstream side of the blade tip. In addition to this, the air jet from the nozzle 6b on the trailing edge 4b near the blade tip blows away the vortex generated in the vicinity of the blade tip trailing edge, and the blade tip vortex 20a is forced to be relocated to outside of the plane of rotation of the rotor blade 1A. The blade tip vortex 20a generated in this fashion is not directly slapped by the following blade 1B, thus the noise can be reduced greatly.

Figure 5:
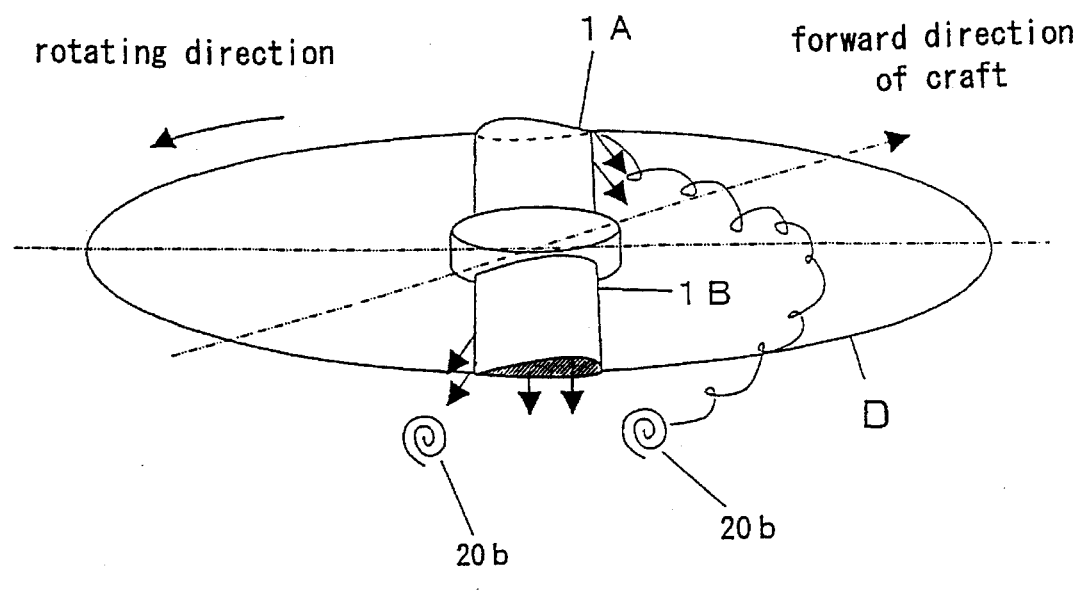
FIG. 5 is a perspective view showing the relationship between rotor blades with the noise reduction device and the blade tip vortices.

In addition, since the jet ejection angles of nozzles 6a and 6b at the blade tip 4a and on the trailing edge 4b near the blade tip are adjustable in this invention, by ejecting the jet of air from the preceding blade 1A upward or downward, the blade tip vortex 20b can be relocated to above or below the blade plane of rotation D, as shown in FIG. 5. As a result, if the tip vortex 20b generated outside of the plane of rotation of the blade 1A, comes into the plane of rotation of the following blade 1B due to the various flight conditions such as the fuselage flight attitude, flight mode, and strength of the relative wind, the following blade 1B avoids the tip vortex 20b, thus preventing the generation of noise.

Figure 6:
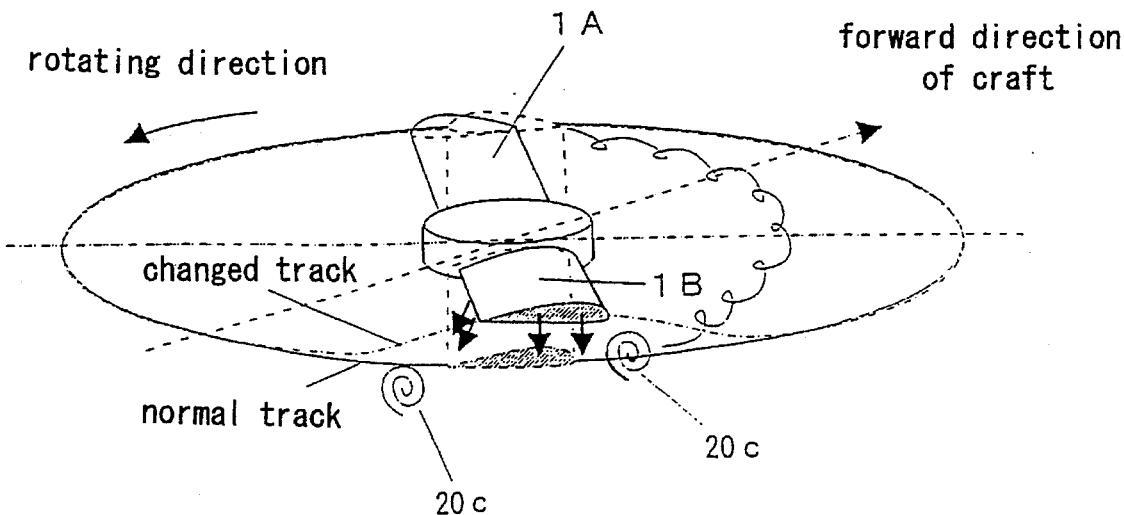
FIG. 6 is a perspective view showing another relationship between the rotor blades with the noise reduction device and the blade tip vortices.

Additionally, even if the tip vortex caused by the preceding blade 1A is forced to be generated above or below the plane of rotation as shown in FIG. 5, depending on the flight condition or air current condition, the tip vortex 20c comes into the rotational area of the following blade 1B as shown in FIG. 6, and there is a chance that the following blade 1B slaps the tip vortex 20c. Accordingly, in such a case, a jet of air is ejected upward or downward from the nozzles of the blade 1B before the blade 1B strikes the tip vortex 20c, changing the rotational tracking pass of the following blade 1B by the reaction of the jet. Thus, avoiding the slapping of the tip vortex 20c by the following blade 1B, the system can definitely prevent the noise and vibration due to the tip vortex interaction.

In this case, the tip vortex 20c generated by the rotation of the preceding blade 1A comes into the rotational range of the following blade 1B due to flight or air current conditions, and causes interaction in rotation. Since the interaction is known to occur within the certain limited azimuth position of the following blade 1B, the jet of air is ejected upward or downward by operating the ejection angle control device 5 of the blade 1B from the cockpit before the blade 1B enters this azimuth position. Thus, moving the blade tip upward or downward to avoid a collision with the tip vortex 20c, at the same time, moving the tracking pass of the tip vortex 20c upward or downward, the slapping of the tip vortex by the following blade can be avoided.

Accordingly, the present invention can change the tracking pass and the position of tip vortex generation by a simple technique, and move the blade tip upward or downward from the normal pass. Thus, it can precisely avoid the collision of the rotor blade with the tip vortex. The previous method of preventing the tip vortex noise generation by changing the blade pitch angle, in addition to the pitch angle variation to fly the rotorcraft by the operation of the swash plate, provides rotor blade pitch angle changes which are higher orders than the rotational speed, using heavy-duty steering actuators of high frequency. The present invention does not require such complex systems as described, and has advantage of eliminating noise and vibration due to the blade tip vortex by the simple operation of this system.

Finally, it will be understood by those skilled in the art that the forgoing description of the preferred embodiment of the disclosed structure is merely an example of an embodiment of the present invention, and that various changes and modifications may be made to the present invention without departing from the spirit and scope thereof.

What is claimed is:

1. A noise reduction device for a rotorcraft having a fuselage, comprising:

an air-producing means for producing compressed air, said air-producing means being arranged in said fuselage of said rotorcraft;

a drive shaft driven by an engine of said rotorcraft, said drive shaft having a first air supply passage formed therein so as to connect with said air-producing means to permit the flow of the compressed air;

rotor blades connected to said drive shaft, each of said rotor blades having a second air supply passage formed therein to communicate with said first air supply passage of said drive shaft;

ejection nozzles for ejecting the compressed air supplied through said second air supply passage out of said rotor blades, said ejection nozzles being arranged at respective blade tips of said rotor blades and on respective trailing edges near said blade tips of said rotor blades to eject the compressed air; and ejection adjusting means for adjusting the ejection pressure and ejection angle of the compressed air ejected from said injection nozzles corresponding to the flying condition of said rotorcraft and the azimuth position of each of said rotor blades;

wherein said ejection adjusting means is arranged in said ejection nozzles.

2. A noise reduction device for a rotorcraft, as claimed in claim 1, wherein said ejection adjusting means comprises a regulating air supply passage extending along said second air supply passage and an air tube arranged in each of said ejection nozzles so as to be expandable by air supplied through the intermediary of said regulating air supply passage.

3. A noise reduction device for a rotorcraft, as claimed in claim 2, wherein said air-producing means is a part of said engine.

4. A noise reduction device for a rotorcraft, as claimed in claim 3, wherein said air-producing means comprises a pressurized air control device for controlling pressure of the compressed air.

5. A noise reduction device for a rotorcraft, as claimed in claim 4, wherein said pressurized air control device has a variety of valve mechanisms connected with an air compression section of said engine.

6. A noise reduction device for a rotorcraft, as claimed in claim 2, wherein each said air tube is provided with a bellows to change the height of said air tube.

7. A noise reduction device for a rotorcraft, as claimed in claim 6, wherein each said air tube is provided with a flap which is pivotably mounted on said regulating air supply passage so as to cover said bellows.

* * * * *